(12) United States Patent
Zhao et al.

(10) Patent No.: US 11,474,255 B2
(45) Date of Patent: Oct. 18, 2022

(54) SYSTEM AND METHOD FOR DETERMINING OPTIMAL LIDAR PLACEMENT ON AUTONOMOUS VEHICLES

(71) Applicant: THE REGENTS OF THE UNIVERSITY OF MICHIGAN, Ann Arbor, MI (US)

(72) Inventors: Ding Zhao, Dearborn, MI (US); Senyu Mou, Dearborn, MI (US); Yan Chang, Dearborn, MI (US); Wenshuo Wang, Dearborn, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 849 days.

(21) Appl. No.: 16/373,922

(22) Filed: Apr. 3, 2019

(65) Prior Publication Data
US 2020/0191972 A1  Jun. 18, 2020

Related U.S. Application Data

(60) Provisional application No. 62/779,640, filed on Dec. 14, 2018.

(51) Int. Cl.
*G01S 7/497* (2006.01)
*G01S 17/93* (2020.01)
*G01S 17/931* (2020.01)

(52) U.S. Cl.
CPC ............ *G01S 17/931* (2020.01); *G01S 7/497* (2013.01)

(58) Field of Classification Search
CPC ...... G01S 17/931; G01S 7/497; G01S 17/936; G01S 13/865; G01S 13/931; G01S 17/86; G01S 17/87; G01S 15/86; G01S 15/931

USPC ........................................................ 356/4.01
See application file for complete search history.

(56) References Cited

PUBLICATIONS

Wijesoma et al., "Road-Boundary detection and tracking using ladar sensing," IEEE Transactions on Robotics and Automation, vol. 20, Issue 3, pp. 456-464, Jun. 2004 (Abstract).
Maclachlan and Mertz, "Tracking of Moving Objects from a Moving Vehicle Using Scanning Laser Rangefinder," 2006 IEEE Intelligent Transportation Systems Conference, pp. 301-306 (Sep. 2006).
Zhang and Singh, "LOAM: Lidar Odometry and Mapping in Real-Time," Robotics: Science and Systems 2014, 9 pages (2014).

(Continued)

*Primary Examiner* — Daniel L Murphy
(74) *Attorney, Agent, or Firm* — Christopher G. Darrow; Darrow Mustafa PC

(57) ABSTRACT

In one embodiment, example systems and methods related to a manner of optimizing LiDAR sensor placement on autonomous vehicles are provided. A range-of-interest is defined for the autonomous vehicle that includes the distances from which the autonomous vehicle is interested in collecting sensor data. The range-of-interest is segmented into multiple cubes of the same size. For each LiDAR sensor, a shape is determined based on information such as the number of lasers in each LiDAR sensor and the angle associated with each laser. An optimization problem is solved using the determined shape for each LiDAR sensor and the cubes of the range-of-interest to determine the locations to place each LiDAR sensor to maximize the number of cubes that are captured. The optimization problem may further determine the optimal pitch angle and roll angle to use for each LiDAR sensor to maximize the number of cubes that are captured.

20 Claims, 8 Drawing Sheets

(56) References Cited

PUBLICATIONS

"2018 Self-Driving Safety Report," https://www.gm.com/content/dam/company/docs/us/en/gmcom/gmsafetyreport.pdf, accessed Mar. 21, 2019.

"On the Road to Fully Self-Driving," https://storage.googleapis.com/sdc-prod/v1/safety-report/waymo-safety-report-2017.pdf, accessed Mar. 21, 2019.

Crowe, "How Uber Self-Driving Cars See the World," The Robot Report (2018), https://www.therobotreport.com/how-uber-self-driving-cars-see-world/, accessed Mar. 21, 2019.

"Autonomous Driving Unit," Baidu USA (2017), http://usa.baidu.com/adu/, accessed Mar. 21, 2019.

Hawkins, "Apple Expands its fleet of self-driving cars in California," The Verge (2018), https://www.theverge.com/2018/1/25/16932716/apple-expand-fleet-self-driving-cars-california-lexus, accessed Mar. 21, 2019.

"Perl Lab," http://robots.engin.umich.edu/, accessed Mar. 21, 2019.

"Stanford Autonomous Driving Team," http://driving.stanford.edu/, accessed Mar. 21, 2019.

Zhang, "Optimal Sensor Placement," Proceedings in 1992 IEEE International Conference on Robotics and Automation, vol. 2, pp. 1825-1830, May 1992 (Abstract).

Dybedal and Hovland, "Optimal Placement of 3D Sensors Considering Range and Filed of View," 2017 IEEE International Conference on Advanced Intelligent Mechatronics (AIM), pp. 1588-1593, Jul. 2017 (Abstract).

Banta and Abidi, "Autonomous Placement of a Range Sensor for Acquisition of Optimal 3-D Models," Proceedings of the 22nd International Conference on Industrial Electronics, Control, and Instrumentation, vol. 3, pp. 1583-1588 (1996).

Rahimian and Kearney, "Optimal Camera Placement for Motion Capture Systems," IEEE Transactions on Visualization and Computer Graphics, vol. 23, Issue 3, pp. 1209-1221, 2017 (Abstract).

Bemporad and Morari, "Control of Systems Integrating Logic, Dynamics, and Constraints," Automatica, vol. 35, pp. 407-427 (1999).

SYSTEM AND METHOD FOR DETERMINING OPTIMAL LIDAR PLACEMENT ON AUTONOMOUS VEHICLES

CROSS-REFERENCE TO RELATED APPLICATIONS

This application claims priority to U.S. Provisional Patent Application Ser. No. 62/779,640 titled "AN OPTIMIZATION APPROACH TO CALCULATING OPTIMAL LIDAR CONFIGURATION FOR DATA COLLECTION" and filed on Dec. 14, 2018. The disclosure of which is hereby incorporated by reference in its entirety.

TECHNICAL FIELD

The subject matter described herein relates, in general, to systems and methods for determining an optimal LiDAR sensor configuration for an autonomous vehicle, and, in particular, to determining the location, pitch angle, and roll angle for each LiDAR sensor of a set of LiDAR sensors that maximizes the total coverage of the LiDAR sensors in a range-of-interest of an autonomous vehicle.

BACKGROUND

LiDAR is widely used in autonomous vehicles for a variety of purposes such as object detection and navigation. One reason that LiDAR is popular for autonomous vehicles is that it is highly precise and the point clouds from LiDAR offer a rich description of the environment of the autonomous vehicle.

While using LiDAR is popular, there is no agreed upon standard for the number of LiDAR sensors that may be used on an autonomous vehicle or where such sensors should be placed on the autonomous vehicle. For example, one manufacturer equips their autonomous vehicles with four velodyne-16 LiDAR sensors. The manufacturer places two LiDAR sensors at each side of the roof of the autonomous car with a roll angle between them. Another manufacturer installs one velodyne-64 LiDAR sensor on the roof of the autonomous vehicle.

While many manufacturer use different LiDAR sensor configurations, there is no clear answer as to which LiDAR sensor configuration (and how many LiDAR sensors) is optimal for autonomous vehicles. In general, more LiDAR sensors on an autonomous vehicle may provide more precise information to the autonomous vehicle. However, such information may be redundant due to overlapping coverage areas. Moreover there is a cost associated with each additional LiDAR sensor due to the actual cost of the sensor and the computational costs associated with processing the data generated by the LiDAR sensor.

SUMMARY

In one embodiment, example systems and methods related to a manner of optimizing LiDAR sensor placement on autonomous vehicles are provided. A range-of-interest is defined for the autonomous vehicle that includes the distances from which the autonomous vehicle is interested in collecting sensor data. The range-of-interest is segmented into multiple cubes of the same size. For each LiDAR sensor, a shape is determined based on information such as the number of lasers in each LiDAR sensor and the angle associated with each laser. An optimization problem is solved using the determined shape for each LiDAR sensor and the cubes of the range-of-interest to determine the locations to place each LiDAR sensor to maximize the number of cubes that are captured. The optimization problem may further determine the optimal pitch angle and roll angle to use for each LiDAR sensor to maximize the number of cubes that are captured.

The example systems and methods offer many advantages over current systems and methods for placing LiDAR sensors. As described above, there is currently no consensus or method for optimal liDAR sensor placement on vehicles. As a result, autonomous vehicles often use more LiDAR sensors than is necessary on their autonomous vehicles to ensure sufficient coverage. The excessive use of LiDAR sensors results in wasted resources due to the monetary costs of each additional sensor, and wasted computational resources due to processing the output of each additional sensor. By determining the optimal placement, pitch angle, and roll angle for each LiDAR sensor, the total number of LiDAR sensors used by an autonomous vehicle can be reduced while maintaining a desired range and breadth of detection. Reducing the number of LiDAR sensors reduces costs and increases computational efficiency, and results in an improvement to any autonomous vehicle that incorporates the systems and methods described herein.

In one embodiment, a system for optimizing LiDAR sensor placement for an autonomous vehicle is provided. The system includes one or more processors and a memory communicably coupled to the one or more processors. The memory stores a region of interest module including instructions that when executed by the one or more processors cause the one or more processors to receive information about an autonomous vehicle, wherein the information comprises a plurality of LiDAR sensor locations on the autonomous vehicle, generate a range-of-interest for the autonomous vehicle, wherein the autonomous vehicle is centered in the range-of-interest and segment the range-of-interest into a plurality of units. The memory stores a shape module including instructions that when executed by the one or more processors cause the one or more processors to determine a shape for each LiDAR sensor based on information about each LiDAR sensor. The memory stores a selection module including instructions that when executed by the one or more processors cause the one or more processors to select, for each LiDAR sensor of the plurality of LiDAR sensors, a LiDAR sensor location from the set of LiDAR sensor locations of the autonomous vehicle, wherein the selected LiDAR sensor locations maximize a number of units of the plurality of units that are captured by the shapes determined for each LiDAR sensor.

In one embodiment, a method for optimizing LiDAR sensor placement for an autonomous vehicle is provided. The method includes receiving information about an autonomous vehicle, wherein the information comprises a plurality of LiDAR sensor locations on the autonomous vehicle, generating a range-of-interest for the autonomous vehicle, wherein the autonomous vehicle is centered in the range-of-interest segmenting the range-of-interest into a plurality of units, receiving information about each LiDAR sensor of a plurality of LiDAR sensors, wherein the information about a LiDAR sensor comprises a number of lasers associated with the LiDAR and an angle associated with each laser, for each LiDAR sensor of the plurality of LiDAR sensors, determining a shape for the LiDAR sensor based on the information about the liDAR sensor, and selecting, for each LiDAR sensor of the plurality of LiDAR sensors, a LiDAR sensor location from the plurality of LiDAR sensor locations of the autonomous vehicle, wherein the selected LiDAR sensor locations maximize a number of units of the plurality of units that are captured by the shapes determined for each LiDAR sensor.

In one embodiment, a non-transitory computer-readable medium for optimizing LiDAR sensor placement for an autonomous vehicle is provided. The computer-readable medium including instructions that when executed by one or more processors cause the one or more processors to receive information about an autonomous vehicle, wherein the information comprises a set of LiDAR sensor locations on the autonomous vehicle, receive a range-of-interest for the autonomous vehicle, wherein the autonomous vehicle is centered in the range-of-interest and the range-of-interest is segmented into a plurality of units, receive information about each LiDAR sensor of a plurality of LiDAR sensors, wherein the information about a LiDAR sensor comprises a number of lasers associated with each LiDAR and an angle associated with each laser, for each LiDAR sensor of the plurality of LiDAR, determine a shape for the LiDAR sensor based on the information about the LiDAR sensor, and select, for each LiDAR sensor of the plurality of LiDAR sensors, a LiDAR sensor location from the set of LiDAR sensor locations of the autonomous vehicle, a roll angle for the LiDAR sensor, and a pitch angle for the LiDAR sensor, wherein the selected LiDAR sensor locations, roll angles, and pitch angles maximize a number of units of the plurality of units that are captured by the shapes determined for each LiDAR sensor.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with determining the optimal location, roll angle, and pitch angle for LiDAR sensors placed on an autonomous vehicle are disclosed. LiDAR (i.e., "light detection and ranging") is a remote sensing technology which uses the pulse from a laser to collect measurements which can then be used to create 3D models and maps of objects and environments. LiDAR sensors are used extensively in autonomous vehicles to provide autonomous vehicle functions such as object detection and navigation. A LiDAR sensor is made up of multiple lasers that each sweep 360 degrees at an associated angle. The number of lasers used in each LiDAR sensor, as well as their range of coverage, may vary by LiDAR sensor manufacturer.

Typically, LiDAR sensors are arranged on various locations on the frame of an autonomous vehicle at a pitch angle and a roll angle. The pitch angle may be an angle of the LiDAR sensor relative to the left and right side of the autonomous vehicle. The roll angle may be the angle of the LiDAR sensor relative to the front and back of the vehicle. As described above, determining the optimal location, pitch angle, and roll angle (collectively referred to herein as the LiDAR sensor placement) for each LiDAR sensor that maximizes the overall coverage for the autonomous vehicle 100 is desirable to reduce the overall number of LiDAR sensors that are used.

Figure 1:
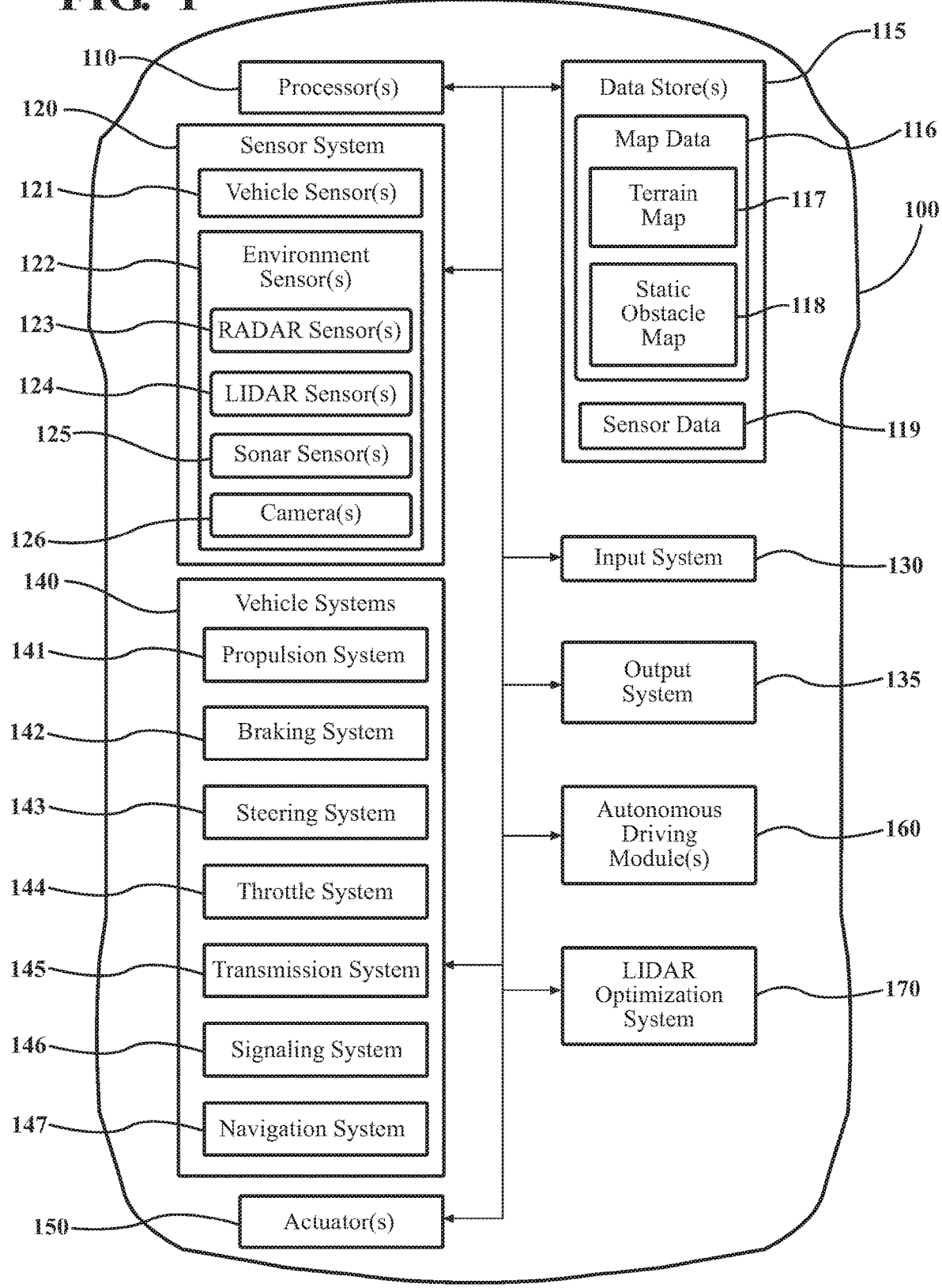
FIG. 1 illustrates one embodiment of a vehicle within which systems and methods disclosed herein may be implemented.

Referring to FIG. 1 an example autonomous vehicle 100 capable of implementation the various systems and methods described herein is shown. The autonomous vehicle 100 also includes various elements. It will be understood that in various embodiments it may not be necessary for the autonomous vehicle 100 to have all of the elements shown in FIG. 1. The autonomous vehicle 100 can have any combination of the various elements shown in FIG. 1. Further, the autonomous vehicle 100 can have additional elements to those shown in FIG. 1. In some arrangements, the autonomous vehicle 100 may be implemented without one or more of the elements shown in FIG. 1. While the various elements are shown as being located within the autonomous vehicle 100 in FIG. 1, it will be understood that one or more of these elements can be located external to the autonomous vehicle 100. Further, the elements shown may be physically separated by large distances.

Some of the possible elements of the autonomous vehicle 100 are shown in FIG. 1 and will be described along with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the autonomous vehicle 100 includes a LiDAR optimization system 170 that is implemented to perform methods and other functions as disclosed herein relating to determining optimal paths for the autonomous vehicle 100. The noted functions and methods will become more apparent with a further discussion of the figures.

Figure 2:
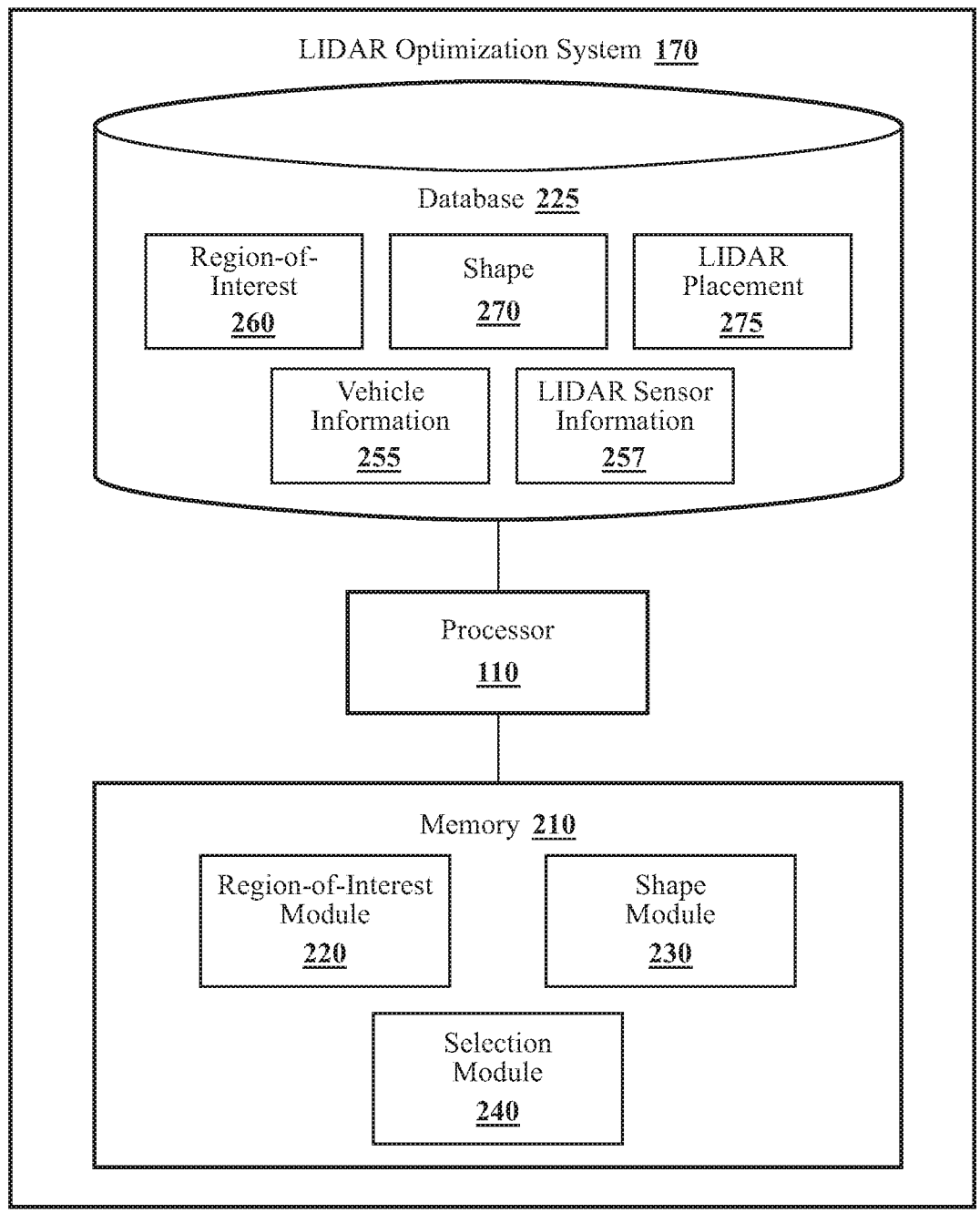
FIG. 2 illustrates one example of a LiDAR optimization system as embodied herein.
Figure 3:
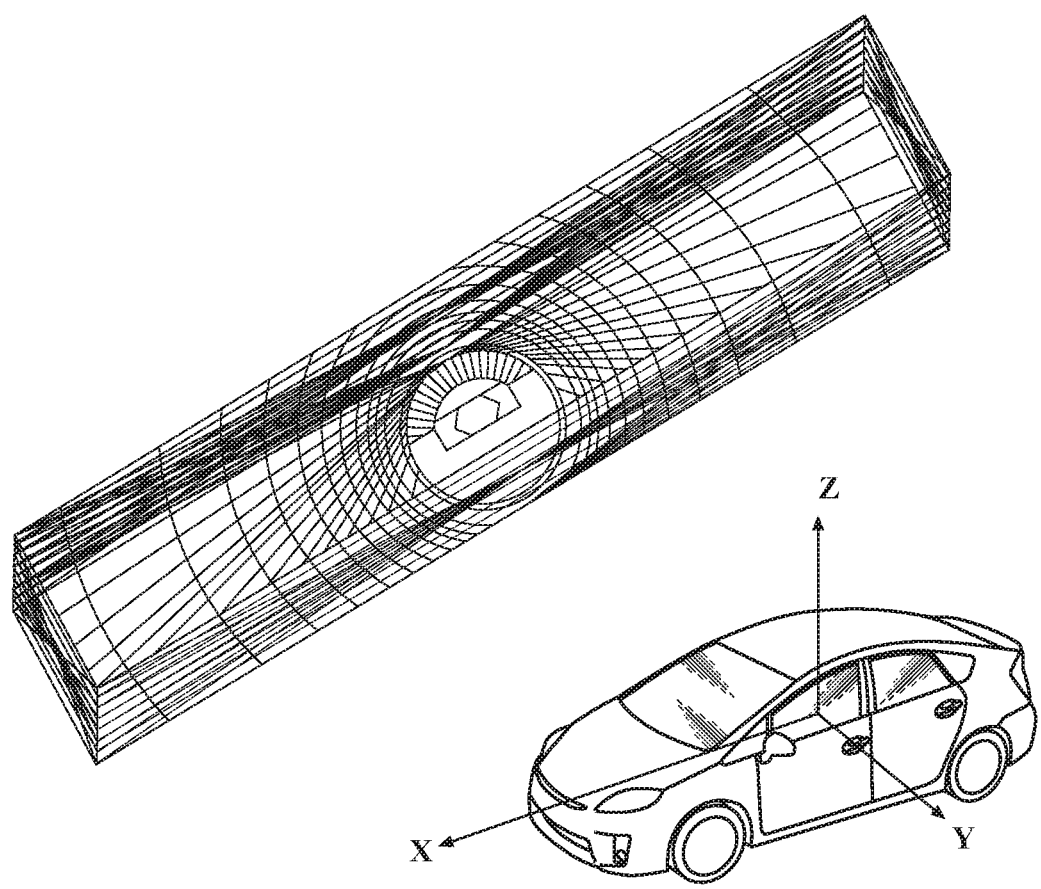
FIG. 3 illustrates an example range-of-interest as embodied herein.
Figure 4:
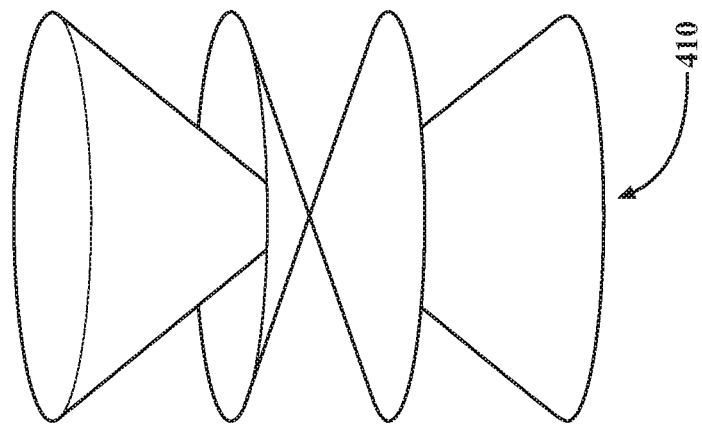
FIG. 4 illustrates an example shape for a LiDAR sensor as embodied herein.
Figure 4:
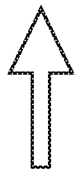
Figure 4:
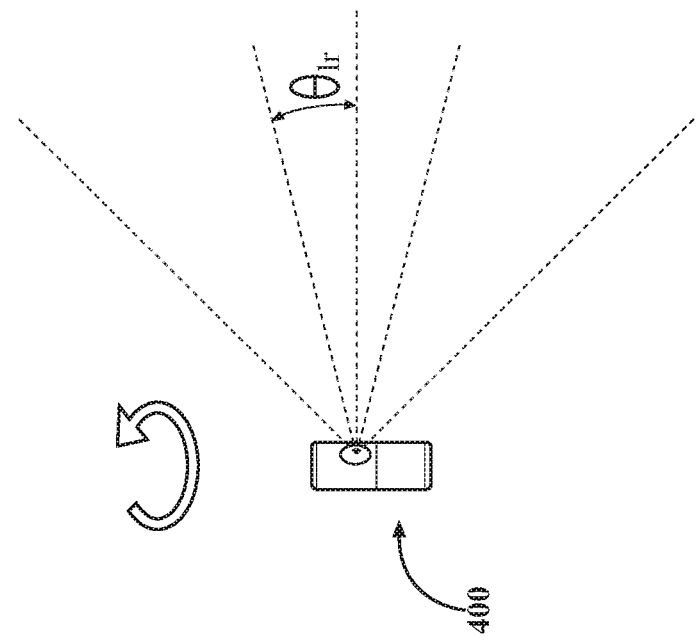

With reference to FIG. 2, one embodiment of the LiDAR optimization system 170 of FIG. 1 is further illustrated. The LiDAR optimization system 170 is shown as including a processor 110 from the autonomous vehicle 100 of FIG. 1. Accordingly, the processor 110 may be a part of the LiDAR optimization system 170, the LiDAR optimization system 170 may include a separate processor from the processor 110 of the autonomous vehicle 100 or the LiDAR optimization system 170 may access the processor 110 through a data bus or another communication path. It should be appreciated, that while the LiDAR optimization system 170 is illustrated as being a single contained system within the autonomous vehicle 100, in various embodiments, the LiDAR optimization system 170 is a distributed system that is comprised of components that can be provided as a centralized server, a cloud-based service, and so on. Moreover, the LiDAR optimization system 170 described herein is not limited to vehicle-based implementations, but may be implemented using any general purpose computing device.

In one embodiment, the LiDAR optimization system 170 includes a memory 210 that stores a range-of-interest module 220, a shape module 230, and a selection module 240. More or fewer modules may be supported. The memory 210 is a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the processor 110 cause the processor 110 to perform the various functions disclosed herein. Moreover, as previously noted, in various embodiments, one or more aspects of the LiDAR optimization system 170 are implemented as cloud-based services, and so on. Thus, one or more modules of the LiDAR optimization system 170 may be located remotely from other components and may be implemented in a distributed manner.

Furthermore, in one embodiment, the LiDAR optimization system 170 includes the database 225. The database 225 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 225 stores data used by the modules 220, 230, and 240 in executing various functions. In one embodiment, the database 225 includes a range-of-interest 260 along with, for example, other information that is used and/or generated by the modules 220, 230, and 240 such as one or more shapes 270, vehicle information 255, LiDAR sensor information 257, and LiDAR placements 275. Of course, in further embodiments, the various information may be stored within the memory 210 or another suitable location.

The range-of-interest module 220 may be configured to generate a range-of-interest 260 for an autonomous vehicle 100. The autonomous vehicle 100 may be the autonomous vehicle 100 that the one or more LiDAR sensors are being placed on. As used herein the range-of-interest 260 may be a three-dimensional box (or other shape) that represents the space around the autonomous vehicle 100 that LiDAR sensor data is to be collected from. For purposes of determining the optimal placement for the LiDAR sensors (i.e., location, pitch angle, and roll angle with respect to the frame of the autonomous vehicle 100), only sensor data that is collected from within the range-of-interest 260 may be considered.

The range-of-interest 260 may be a cube having preset dimensions that is centered about the frame of the autonomous vehicle 100. In particular, the origin of the x-y plane of the range-of-interest 260 may be aligned with the x-y plane of the frame of the autonomous vehicle 100. Continuing to FIG. 3, an example range-of-interest 300 is shown surrounding the frame of an autonomous vehicle 100. In the example, the range-of-interest 300 is a rectangular prism that is centered about the frame of the autonomous vehicle 100.

Returning to FIG. 2, in some embodiments, the size of the range-of-interest 260 may be fixed. An example range-of-interest 260 is approximately 5 m in height, 9 m in width, and 80 m in length. Other sizes may be used. In other embodiments, the size of the range-of-interest 260 may be based on the dimensions or size of the frame of the autonomous vehicle 100. As may be appreciated, a truck may need a larger range-of-interest 260 than a compact vehicle. The dimensions of the vehicle 100 may be provided to the range-of-interest module 220 as part of the vehicle information 255.

The shape module 230 may generate a shape 270 for each of the LiDAR sensors being placed on the autonomous vehicle 100. The shape 270 for a LiDAR sensor may be a model of the coverage area of the LiDAR sensor and may be later used to determine how much of the range-of-interest 260 the LiDAR sensor covers when placed at a particular location, pitch angle, and roll angle on the frame of the autonomous vehicle 100.

In some embodiments, the shape 270 for a LiDAR sensor may be may be modeled as a series of cones formed by each laser of the LiDAR sensor as it rotates at its associated angle. Continuing to FIG. 4, an example shape 410 for a LiDAR sensor 400 is illustrated. As shown, the LiDAR sensor 400 includes four lasers, each emitted with a different angle $\theta_{lr}$. As each laser of the LiDAR sensor 400 rotates the shape 410 is formed that includes a cone for each of the lasers. The number of lasers, the angle associated with each laser, and the range of each laser may be provided to the shape module 230 as the LiDAR sensor information 257.

Returning to FIG. 2, the cones that make up the shape 270 may be used to segment the range-of-interest 260 into a plurality of subspaces, with each subspace capturing some portion of the range-of-interest 260. The subspaces captured by a particular cone in the range-of-interest 260 may represent the area captured by the laser associated with the cone.

To achieve the most informative perception, the lasers of the LiDAR sensors may be able to detect very small objects. Accordingly, to represent the subspaces captured by the shapes 270, the range-of-interest module 220 may segment the range-of-interest 260 into a plurality of what are referred to herein as units. Each unit may be a shape such as an inscribed sphere or a cube. A unit in the range-of-interest 260 may be either inside a subspace formed by a particular shape 270 when placed in the range-of-interest 260, or may be outside of the subspace. The particular size of each unit may be based on the size of the smallest object that may be detected by a LiDAR sensor. Other sizes may be used.

Figure 5A:
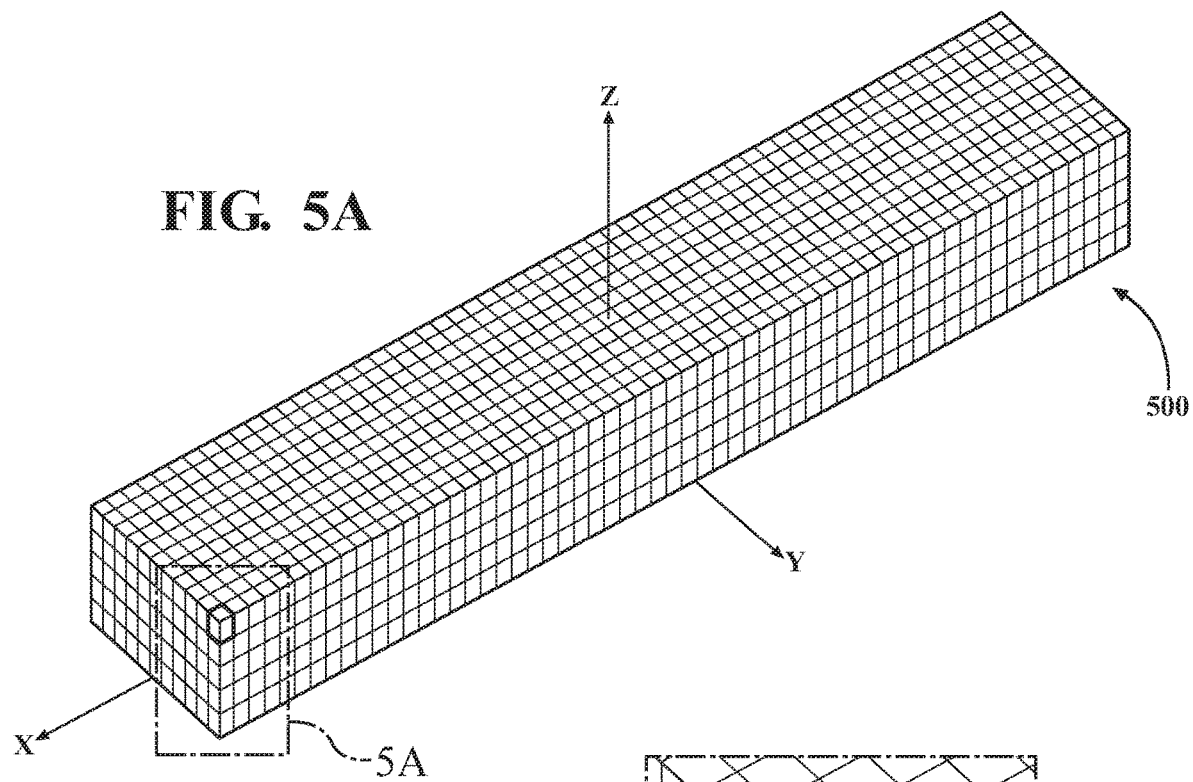
FIGS. 5A and 5B are illustrations of a range-of-interest divided into a plurality of units as embodied herein.
Figure 5B:
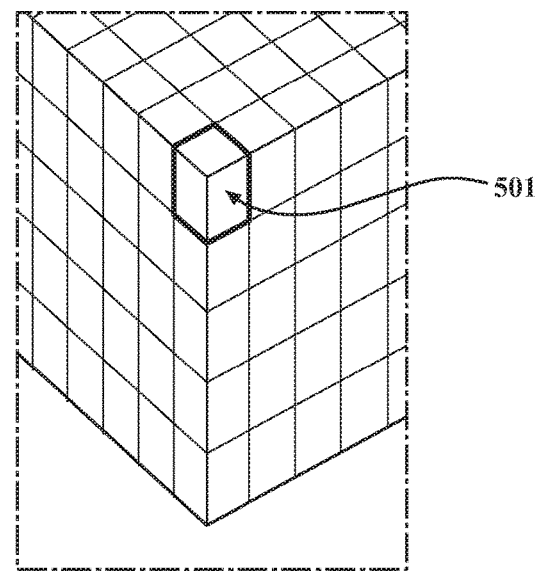

Continuing to FIG. 5a, an illustration of a range-of-interest 500 divided into a plurality of units is shown. In the example shown the units are cubes, although other shapes may be used. A single cube 501 is also shown in FIG. 5b.

Returning to FIG. 2, the selection module 240 may be configured to determine the number of units in the subspaces captured by each of the shapes 270 corresponding to LiDAR sensors at particular locations on the autonomous vehicle 100, and to select the optimal locations for each LiDAR sensor based on the total number of units captured. The selection module 240 may further be configured to select the optimal pitch and roll angle for each LiDAR sensor. The optimal location, pitch angle, and roll angle for a LiDAR sensor is referred to herein as the LiDAR placement 275. The location of each LiDAR sensor has an x, y, and z coordinate with respect to a coordinate system or reference frame of the autonomous vehicle 100.

In some embodiments, the selection module 240 may select the optimal locations, pitch angles, and roll angles, (i.e., LiDAR placement 275) by calculating the number of units (e.g., cubes) that are captured by the shapes 270 associated with each LiDAR sensor when placed in the range-of-interest 260 at all possible location, pitch angle, and roll angle combinations for the autonomous vehicle 100. The combinations of locations, pitch angles, and roll angles that maximize the number of units captured is provided by the selection module 240 as the LiDAR placements 275. In one embodiment, a cube is captured by a shape 270 when its center appears in the shape 270.

Depending on the embodiment, the manufacturer associated with the autonomous vehicle 100 may provide a set of permissible locations for the LiDAR sensors to the selection module 240, and the selection module 240 may consider these locations when performing the optimization. The locations may be part of the vehicle information 255 provided by the manufacturer. The vehicle information 255 may further include permissible pitch angles and roll angles to be considered by the selection module 240.

Each cone of a shape 270 may segment the range-of-interest 260 into two subspaces. The two subspaces include the units above the upward side of the cone and the units below the downward side of the cone. Accordingly, $N_1$ LiDAR sensors with $N_r$ laser segments may segment the range-of-interest 260 into $2^{N_l \times N_r}$ subspaces. However, because of the design of LiDAR sensors, some of these subspaces may be empty (i.e., an area where no sensor data is collected). A subspace may be empty when the upward side of a higher beam angle combines with the downward side of a lower laser with a smaller beam angle. As will be described further below, the selection module 240 may only consider non-empty subspaces when selecting locations for LiDAR sensors.

To remove the empty subspaces from consideration when calculating the coverage of a LiDAR sensor shape 270, the selection module 240 may use what is referred to herein as "a combination rule" to segment the range-of-interest 260 for each shape 270. In some embodiments, the combination rule can be modeled as a tree, with each path in the tree representing different combinations of lasers for a particular LiDAR sensor shape 270. From each path the selection module 240 may determine a binary flag $f_{lr}$ to change the sign of inequality for the $lr^{th}$ cone of the shape 270. Thus, one LiDAR sensor with a corresponding shape 270 formed from $N_r$ lasers may segment the range-of-interest 260 into $N_r+1$ nonempty subspaces and $N_1$ LiDAR sensors may segment the range-of-interest 260 into at most $(N_r+1)^{N_l}$ nonempty subspaces.

In some implementations, the selection module 240 may represent the size of a subspace created by a shape 270 associated with a LiDAR sensor by determining a radius of an inscribed sphere. The radius of the inscribed sphere may be based on the number of cubes in the subspace. In some implementations, the selection module 240 may determine cubes for the subspace by using concentric cylinders with centers fixed with the origin of the autonomous vehicle 100 coordinate system. For each subspace created by a shape 270 associated with a LiDAR sensor, the cubes of the range-of-interest 260 that intersect with the sides of different cylinders may be selected as different subsets. The subset that contains the maximum number of cubes may be selected by the selection module 240 to represent the radius of the inscribed sphere.

As described above, each laser of a LiDAR sensor may form its own cone that is part of the shape 270. In order for the selection module 240 to determine whether a cube center is in the upward side or downward side of a cone of a shape 270, the selection module 240 may transfer the center of the cube to the local coordinate system of a particular cone that makes up the shape 270, using the following criteria:

1) The origin of the local coordinate system of the cone may be defined as the starting point of the laser that forms the cone.

2) The x, y, z axis of the coordinate system may be transformed by the various parameters of the associated LiDAR sensor (e.g., the LIDAR sensor information 257).

In the local coordinate systems of each LiDAR sensor, the cones formed by each laser l having an angle $\theta_{lr}$, can be represented using the following equation:

$$z^L = \tan\theta_{lr}\sqrt{(x^L)^2+(y^L)^2}$$

Where $x^L$, $y^L$, $z^L$ are the local coordinates of a LIDAR sensor. If a point or center of a cube is at the upward side of the cone, its local coordinates satisfy the following constraint:

$$z^L - \tan\theta_{lr}\sqrt{(x^L)^2+(y^L)^2} > 0$$

and otherwise its local coordinates satisfy the constraint $$z^L - \tan\theta_{lr}\sqrt{(x^L)^2+(y^L)^2} < 0$$

The selection module 240 may then select an optimal LiDAR placement 275 for a set of LiDAR sensors using the following optimization program. The values represented by each variable are described further below with respect to table 1:

For the $c^{th}$ cube in the subset of the $k^{th}$ cylinder, with center at $[x_c, y_c, z_c]$ in local LiDAR sensor coordinates:

```
For s = 1 to N_ss
    For l = 1 to N_l
        For r = 1 to N_r
            ⎛ x_c^L ⎞        ⎛ x_c ⎞
            ⎜ y_c^L ⎟ = H_l  ⎜ y_c ⎟
            ⎜ z_c^L ⎟        ⎜ z_c ⎟
            ⎝  1   ⎠        ⎝  1  ⎠

IF
                (z^L - tan θ_lr √((x_c^L)^2+(xy^L)^2) > 0
            THEN
                E_sck = 0
            ELSE
                E_sck = 1
        EndFor
    EndFor
EndFor
```

Where $H_l$ is a transformation matrix that transforms the coordinates of the cubes in the range-of-interest 260 into local coordinates of the autonomous vehicle 100 (i.e., frame coordinates) for each of the LiDAR sensors, $E_{sck}$ is the binary value determined by the selection module 240 based on whether or not the $c^{th}$ cube in the subset of the $k^{th}$ cylinder is inside the $s^{th}$ subspace. The representation of the inscribed sphere radius of the $s^{th}$ subspace can be expressed as:

$$F_s(C) = \max_{k=1}^{N_k} \sum_{c=1}^{N_c} E_{sck}$$

The selection module 240 may then optimize the configuration parameters associated with each LiDAR sensor (i.e., C=[X, Y, Z, β, Γ]) using the object function:

$$\overline{C} = \underset{C}{\operatorname{argmin}} \max_{s=1}^{N_s s} F_s(C)$$

The selection module 240 may use the above object function to solve the minimum value of the largest radius among all the inscribed sphere radii. The results of solving the object function are the optimal configuration of the LiDAR sensors for the autonomous vehicle 100 (i.e., the LiDAR placements 275). Because the object function minimizes a maximum value of a set of maximum values, the object function may be expressed in a more general format as:

$$\overline{C} = \underset{C}{\operatorname{argmin}} \max_{s=1,k=1}^{N_s s, N_k} F_s(C)$$

TABLE 1

| Variable | Definition |
| --- | --- |
| $N_l$ | Number of LiDAR sensors |
| $N_r$ | Number of lasers on each LiDAR sensor |
| $N_s$ | Total number of lasers (i.e., $N_l N_r$) |
| $N_c$ | Number of cubes in range-of-interest 260 |
| $N_k$ | Number of cylinders |
| $N_{ss}$ | $(N_r + 1)^{N_l}$: total number of subspaces |
| $\Theta_{lr}$ | Angle of the $r^{th}$ laser on the $l^{th}$ LiDAR sensor |
| $f_{lr}$ | Binary flag to change the sign of the $lr^{th}$ inequality |
| $E_{sck}$ | Binary value to determine whether the $c^{th}$ cube of the $k^{th}$ cylinder is in the $s^{th}$ subspace |
| $x_l$ | x vehicle 100 frame coordinates of the $l^{th}$ LiDAR sensor |
| $y_l$ | y vehicle 100 frame coordinates of the $l^{th}$ LiDAR sensor |
| $z_l$ | z vehicle 100 frame coordinates of the $l^{th}$ LiDAR sensor |
| $\beta_l$ | Pitch angle of the $l^{th}$ LiDAR sensor |
| $\gamma_l$ | Roll angle of the $l^{th}$ LiDAR sensor |
| X | Set of x vehicle 100 frame coordinates of all LiDAR sensors |
| Y | Set of y vehicle 100 frame coordinates of all LiDAR sensors |
| Z | Set of z vehicle 100 frame coordinates of all LiDAR sensors |
| B | Set of pitch angles of all LiDAR sensors |
| Γ | Set of roll angles of all LiDAR sensors |
| C | [X, Y, Z, β, γ]: The configuration parameters of the LiDAR sensors (i.e., the LiDAR placements 275) |
| $F_s(C)$ | The number of cubes in the subspace C |

Figure 6:
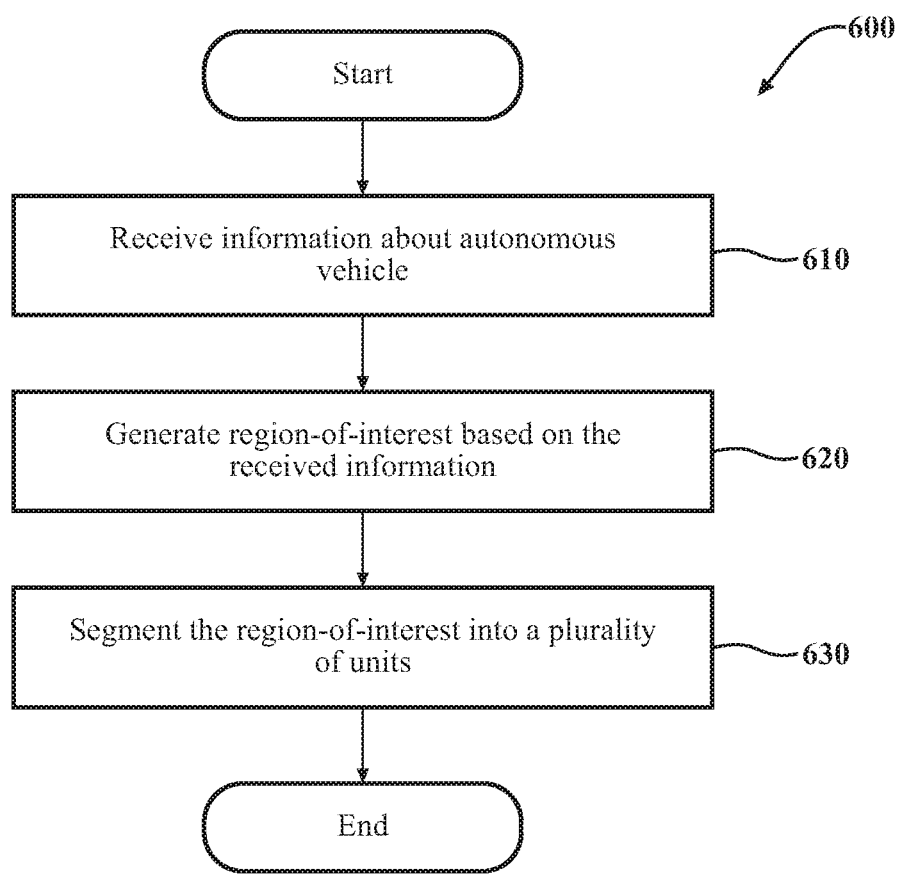
FIG. 6 illustrates a flowchart of a method that is associated with generating a range-of-interest for an autonomous vehicle.

Additional aspects of optimizing LiDAR sensor placement is discussed in relation to FIG. 6. FIG. 6 illustrates a flowchart of a method 600 that is associated with generating a range-of-interest 260 for an autonomous vehicle 100. The method 600 will be discussed from the perspective of the LiDAR optimization system 170 of FIGS. 1 and 2. While the method 600 is discussed in combination with the LiDAR optimization system 170, it should be appreciated that the method 600 is not limited to being implemented within the LiDAR optimization system 170 but is instead one example of a system that may implement the method 600.

At 610, the range-of-interest module 220 receives information about the autonomous vehicle 100. The information about the autonomous vehicle 100 may be the vehicle information 255 and may include information such as the dimensions of the vehicle 100, possible locations on the autonomous vehicle 100 to place one or more LiDAR sensors, and the desired number of LiDAR sensors. Other information may be provided. Depending on the embodiment, the range-of-interest module 220 may receive the vehicle information 255 from a manufacturer associated with the autonomous vehicle 100.

At 620, the range-of-interest module 220 generates a range-of-interest 260 based on the received vehicle information 255. The range-of-interest module 220 may generate the range-of-interest 260 based on the dimensions of a frame associated with the autonomous vehicle 100. For example, the range-of-interest 260 may have a height, width, and length that are based on the height, weight, and length of the frame of the autonomous vehicle 100. The range-of-interest 260 may be a rectangular prism (or other shape) that surrounds the autonomous vehicle 100. The range-of-interest 260 may represent the area surrounding the autonomous vehicle 100 that is to be monitored by one or more LiDAR sensors.

At 630, the range-of-interest module 220 segments the range-of-interest 260 into a plurality of units. The range-of-interest module 220 may segment the range-of-interest into a plurality of cubes, for example. Each cube may be sized similar to the smallest object that may be detected by the one or more LiDAR sensors. Alternatively, each cube may have a default size that is set by a user or administrator.

Figure 7:
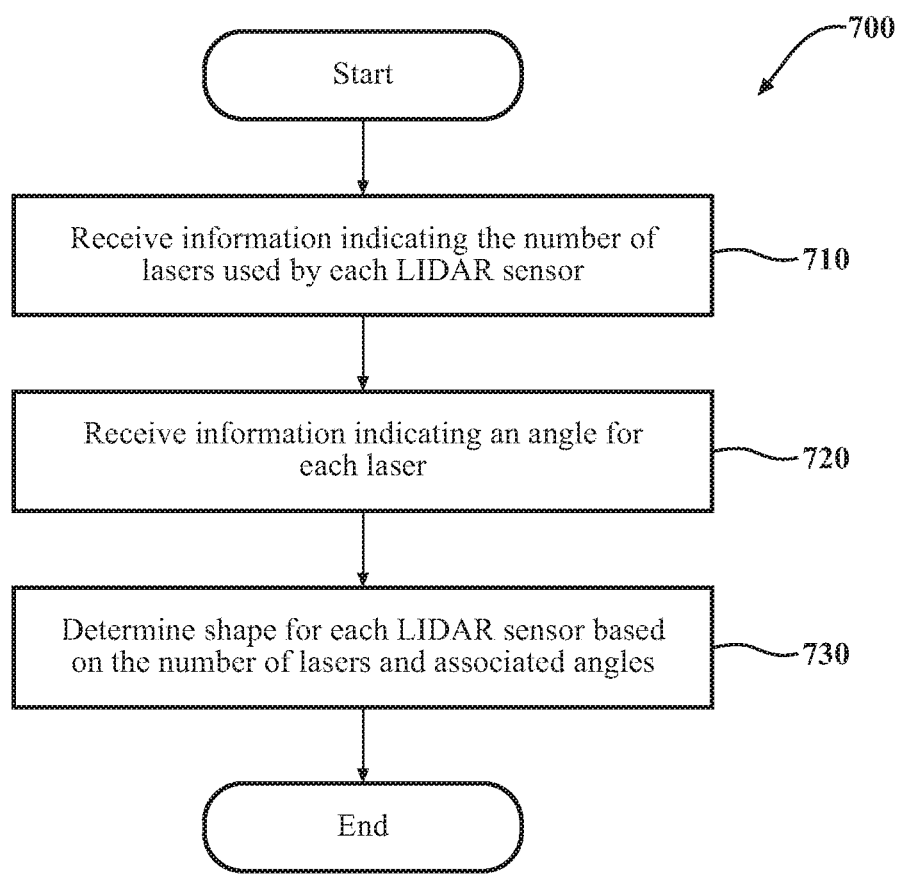
FIG. 7 illustrates a flowchart of a method that is associated with determining shapes for LiDAR sensors based on LiDAR sensor information.

Additional aspects of optimizing LiDAR sensor placement is discussed in relation to FIG. 7. FIG. 7 illustrates a flowchart of a method 700 that is associated with determining shapes for LiDAR sensors based on LiDAR sensor information. The method 700 will be discussed from the perspective of the LiDAR optimization system 170 of FIGS. 1 and 2. While the method 700 is discussed in combination with the LiDAR optimization system 170, it should be appreciated that the method 700 is not limited to being implemented within the LiDAR optimization system 170 but is instead one example of a system that may implement the method 700.

At 710, the shape module 230 receives information indicating the number of lasers used by each LiDAR sensor. The shape module 230 may receive the information indicating the number of lasers as part of the LiDAR sensor information 257. Depending on the embodiment, each LIDAR sensor considered for the autonomous vehicle 100 may have the same number of lasers, or may have different numbers of lasers.

At 720, the shape module 230 receives information indicating the angle associated with each laser of each LiDAR sensor. The shape module 230 may receive the information indicating the angle for each laser as part of the LIDAR sensor information 257. The angles associated with each laser of a LiDAR sensor may be different.

At 730, the shape module 240 determines a shape for each LiDAR sensor based on the number of lasers and the associated angles. The shape module 240 may determine the shape 270 for a LiDAR sensor by, for each laser associated with the LiDAR sensor, modeling the coverage of the laser as a cone with an angle that is based on the angle associated with the laser. Each cone may have the same center axis. The length of the sides of the cone may be based on the range of the laser, for example. The shape module 240 may then combine the cones generated for each laser to form the shape 270 for the LiDAR sensor.

Figure 8:
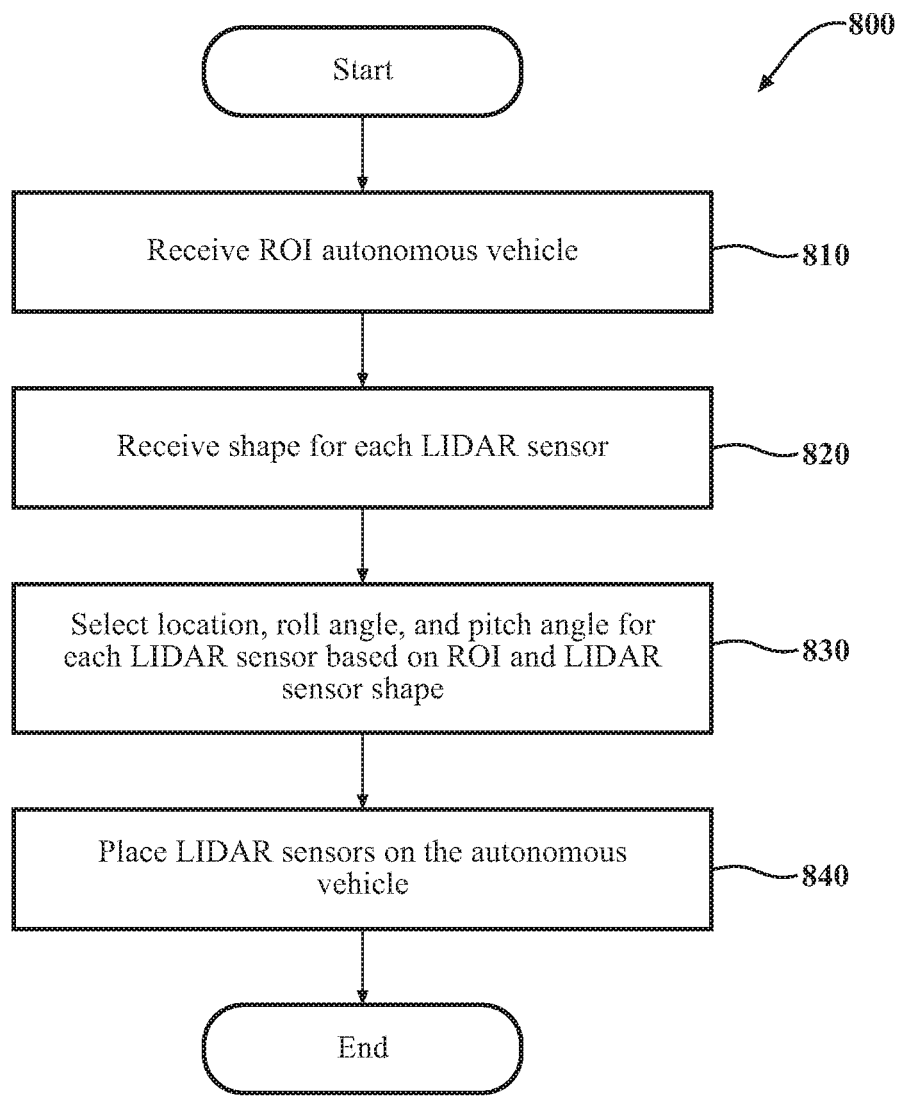
FIG. 8 illustrates a flowchart of a method that is associated with selecting locations, roll angles, and pitch angles for LiDAR sensors on an autonomous vehicle to optimize the amount of sensor data that is collected by the LiDAR sensors.

Additional aspects of optimizing LiDAR sensor placement is discussed in relation to FIG. 8. FIG. 8 illustrates a flowchart of a method 800 that is associated with selecting locations, roll angles, and pitch angles for LiDAR sensors on an autonomous vehicle 100 to optimize the amount of sensor data that is collected by the LiDAR sensors. The method 800 will be discussed from the perspective of the LiDAR optimization system 170 of FIGS. 1 and 2. While the method 800 is discussed in combination with the LiDAR optimization system 170, it should be appreciated that the method 800 is not limited to being implemented within the LiDAR optimization system 170 but is instead one example of a system that may implement the method 800.

At 810, the selection module 240 receives the range-of-interest 260 for an autonomous vehicle 100. The selection module 240 may receive the range-of-interest 260 from the range-of-interest module 220. The range-of-interest 260 may be segmented into a plurality of cubes and may be centered around an autonomous vehicle 100. The range-of-interest 260 may represent the area from which the autonomous vehicle 100 is interested in receiving data about via one or more LiDAR sensors.

At 820, the selection module 240 receives a shape 270 for each LiDAR sensor. The shape 270 for each LiDAR sensor may be a plurality of cones representing each laser of the LiDAR sensor. Other shapes 270 may be used. The number of LiDAR sensors may represent the total number of liDAR sensors that the manufacturer of the autonomous vehicle 100 is interested in placing on the autonomous vehicle 100.

At 830, the selection module 240 selects a location, roll angle, and pitch angle for each LiDAR sensor based on the range-of-interest 260 and the shapes 270 associated with each LiDAR sensor. The selection module 240 may select one or more of the location, roll angle, and pitch angle by solving an optimization problem that maximizes the total number of cubes of the range-of-interest 260 that are captured by the shapes 270 associated with the LiDAR sensors when they are placed on the autonomous vehicle 100 at particular locations, and with particular roll angles and pitch angles. A cube may be considered captured by a shape 270 when its center is inside of the shape 270. The set of acceptable locations, roll angles, and pitch angles that may be considered by the optimization problem may be specified by a manufacturer of the autonomous vehicle 100. For example, the manufacturer of the autonomous vehicle 100 may have a set of locations on the roof of the autonomous vehicle 100 that they are considering for placement of the LiDAR sensors. An example optimization problem is the object function described above.

At 840, the LiDAR sensors are placed on the autonomous vehicle 100 at the selected locations, and with the selected roll angles and pitch angles. The LiDAR sensors may be placed on the autonomous vehicle 100 by the manufacturer of the autonomous vehicle 100 or another user or administrator. Any method for placing LiDAR sensors on autonomous vehicles 100 may be used.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the LiDAR optimization system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the LiDAR optimization system 170, and/or the autonomous driving module(s) 160 may control some or all of these vehicle systems 140 and, thus, may be partially or fully autonomous.

The processor(s) 110, the LiDAR optimization system 170, and/or the autonomous driving module(s) 160 can be operatively connected to communicate with the various vehicle systems 140 and/or individual components thereof. For example, returning to FIG. 1, the processor(s) 110, the LiDAR optimization system 170, and/or the autonomous driving module(s) 160 can be in communication to send and/or receive information from the various vehicle systems 140 to control the movement, speed, maneuvering, heading, direction, etc. of the vehicle 100. The processor(s) 110, the LiDAR optimization system 170, and/or the autonomous driving module(s) 160 may control some or all of these vehicle systems 140.

The processor(s) 110, the LiDAR optimization system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the LiDAR optimization system 170, and/or the autonomous driving module(s) 160 can control the direction and/or speed of the vehicle 100. The processor(s) 110, the LiDAR optimization system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the LiDAR optimization system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium than can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for optimizing LiDAR sensor placement for an autonomous vehicle, comprising:
   one or more processors; and
   a memory communicably coupled to the one or more processors and storing:
   a region of interest module including instructions that when executed by the one or more processors cause the one or more processors to:

receive information about an autonomous vehicle, wherein the information comprises a plurality of LiDAR sensor locations on the autonomous vehicle for a plurality of LiDAR sensors;

generate a range-of-interest for the autonomous vehicle, wherein the autonomous vehicle is centered in the range-of-interest; and segment the range-of-interest into a plurality of units;

a shape module including instructions that when executed by the one or more processors cause the one or more processors to determine a shape for each LiDAR sensor of the plurality of LiDAR sensors based on information about each LiDAR sensor; and a selection module including instructions that when executed by the one or more processors cause the one or more processors to select, for each LiDAR sensor of the plurality of LiDAR sensors, a LiDAR sensor location from the plurality of LiDAR sensor locations of the autonomous vehicle, wherein the selected LiDAR sensor locations maximize a number of units of the plurality of units that are captured by the shapes determined for each LiDAR sensor of the plurality of LiDAR sensors.

2. The system of claim 1, wherein the information about a LiDAR sensor comprises a number of associated lasers and an angle associated with each laser.

3. The system of claim 2, wherein generating the shape for the LiDAR sensor comprises generating a cone for each laser associated with the LiDAR sensor based on the angle associated with the laser.

4. The system of claim 1, wherein the selection module further includes instructions to select, for each LiDAR sensor of the plurality of LiDAR sensors, a LiDAR sensor location from the plurality of LiDAR sensor locations of the autonomous vehicle and a pitch angle for the LiDAR sensor, wherein the selected LiDAR sensor locations and pitch angles maximize the number of units of the plurality of units that are captured by the shapes determined for each LiDAR sensor of the plurality of LiDAR sensors.

5. The system of claim 1, wherein the selection module further includes instructions to select, for each LiDAR sensor of the plurality of LiDAR sensors, a LiDAR sensor location from the plurality of LiDAR sensor locations of the autonomous vehicle and a roll angle for the LiDAR sensor, wherein the selected LiDAR sensor locations and roll angles maximize the number of units of the plurality of units that are captured by the shapes determined for each LiDAR sensor of the plurality of LiDAR sensors.

6. The system of claim 1, wherein the selection module further includes instructions to select, for each LiDAR sensor of the plurality of LiDAR sensors, a LiDAR sensor location from the plurality of LiDAR sensor locations of the autonomous vehicle, a roll angle for the LiDAR sensor, and a pitch angle for the LiDAR sensor, wherein the selected LiDAR sensor locations, roll angles, and pitch angles maximize the number of units of the plurality of units that are captured by the shapes determined for each LiDAR sensor.

7. The system of claim 1, wherein the selection module maximizes the number of units of the plurality of units that are captured by the shapes determined for each LiDAR sensor of the plurality of LiDAR sensors using an object function.

8. A method for optimizing LiDAR sensor placement for an autonomous vehicle, the method comprising:

receiving information about an autonomous vehicle, wherein the information comprises a plurality of LiDAR sensor locations on the autonomous vehicle;

generating a range-of-interest for the autonomous vehicle, wherein the autonomous vehicle is centered in the range-of-interest;

segmenting the range-of-interest into a plurality of units;

receiving information about each LiDAR sensor of a plurality of LiDAR sensors, wherein the information about a LiDAR sensor comprises a number of lasers associated with the LiDAR sensor and an angle associated with each laser;

for each LiDAR sensor of the plurality of LiDAR sensors, determining a shape for the LiDAR sensor based on the information about the LiDAR sensor; and selecting, for each LiDAR sensor of the plurality of LiDAR sensors, a LiDAR sensor location from the plurality of LiDAR sensor locations of the autonomous vehicle, wherein the selected LiDAR sensor locations maximize a number of units of the plurality of units that are captured by the shapes determined for each LiDAR sensor of the plurality of LiDAR sensors.

9. The method of claim 8, wherein the received information about the autonomous vehicle further comprises dimensions of the autonomous vehicle.

10. The method of claim 9, wherein the range-of-interest is generated based on the dimensions of the vehicle.

11. The method of claim 8, wherein the plurality of units are cubes.

12. The method of claim 8, wherein generating the shape for the LiDAR sensor comprises generating a cone for each laser associated with the LiDAR sensor based on the angle associated with the laser.

13. The method of claim 8, further comprising placing the LiDAR sensors of the plurality of LiDAR sensors on the autonomous vehicle at the selected LiDAR sensor locations.

14. The method of claim 8, further comprising selecting, for each LiDAR sensor of the plurality of LiDAR sensors, a LiDAR sensor location from the plurality of LiDAR sensor locations of the autonomous vehicle and a pitch angle for the LiDAR sensor, wherein the selected LiDAR sensor locations and pitch angles maximize the number of units of the plurality of units that are captured by the shapes determined for each LiDAR sensor of the plurality of LiDAR sensors.

15. The method of claim 8, further comprising selecting, for each LiDAR sensor of the plurality of LiDAR sensors, a LiDAR sensor location from the plurality of LiDAR sensor locations of the autonomous vehicle and a roll angle for the LiDAR sensor, wherein the selected LiDAR sensor locations and roll angles maximize the number of units of the plurality of units that are captured by the shapes determined for each LiDAR sensor of the plurality of LiDAR sensors.

16. The method of claim 8, further comprising selecting, for each LiDAR sensor of the plurality of LiDAR sensors, a LiDAR sensor location from the plurality of LiDAR sensor locations of the autonomous vehicle, a roll angle for the LiDAR sensor, and a pitch angle for the LiDAR sensor, wherein the selected LiDAR sensor locations, roll angles, and pitch angles maximize the number of units of the plurality of units that are captured by the shapes determined for each LiDAR sensor.

17. A non-transitory computer-readable medium for optimizing LiDAR sensor placement for an autonomous vehicle and including instructions that when executed by one or more processors cause the one or more processors to:

receive information about an autonomous vehicle, wherein the information comprises a plurality of LiDAR sensor locations on the autonomous vehicle;

receive a range-of-interest for the autonomous vehicle, wherein the autonomous vehicle is centered in the range-of-interest and the range-of-interest is segmented into a plurality of units;

receive information about each LiDAR sensor of a plurality of LiDAR sensors, wherein the information about a LiDAR sensor comprises a number of lasers associated with the LiDAR and an angle associated with each laser;

for each LiDAR sensor of the plurality of LiDAR, determine a shape for the LiDAR sensor based on the information about the LiDAR sensor; and selecting, for each LiDAR sensor of the plurality of LiDAR sensors, a LiDAR sensor location from the plurality of LiDAR sensor locations of the autonomous vehicle, a roll angle for the LiDAR sensor, and a pitch angle for the LiDAR sensor, wherein the selected LiDAR sensor locations, roll angles, and pitch angles maximize a number of units of the plurality of units that are captured by the shapes determined for each LiDAR sensor of the plurality of LiDAR sensors.

18. The non-transitory computer-readable medium of claim 17, further comprising placing the LiDAR sensors of the plurality of LiDAR sensors on the autonomous vehicle at the selected LiDAR sensor locations.

19. The non-transitory computer-readable medium of claim 17, wherein generating the shape for the LiDAR sensor comprises generating a cone for each laser associated with the LiDAR sensor based on the angle associated with the laser.

20. The non-transitory computer-readable medium of claim 17, wherein there are at least two LiDAR sensors in the plurality of LiDAR sensors.

* * * * *